United States Patent [19]
Overton

[11] Patent Number: 5,801,843
[45] Date of Patent: Sep. 1, 1998

[54] PIXEL CORRECTION AND SMOOTHING METHOD

[75] Inventor: Mark A. Overton, Escondido, Calif.

[73] Assignee: Hewlett-Packard Company, Palo Alto, Calif.

[21] Appl. No.: 657,291

[22] Filed: Jun. 4, 1996

Related U.S. Application Data

[63] Continuation of Ser. No. 417,324, Apr. 5, 1995, which is a continuation of Ser. No. 212,445, Mar. 11, 1994, Pat. No. 5,440,407.

[51] Int. Cl.$^6$ .................................. H04N 1/40; G06K 9/40
[52] U.S. Cl. .................. 358/447; 358/445; 358/463; 382/199; 382/254; 382/267
[58] Field of Search ..................... 358/447, 443, 358/445, 463, 464, 465; 382/254, 256, 266, 267–299, 252, 199, 205

[56] References Cited

U.S. PATENT DOCUMENTS

| | | | |
|---|---|---|---|
| 4,193,092 | 3/1980 | Stoffel | 358/138 |
| 4,280,144 | 7/1981 | Bacon | 358/455 |
| 4,389,677 | 6/1983 | Rushby et al. | 358/280 |
| 4,437,122 | 3/1984 | Walsh et al. | 358/166 |
| 4,847,641 | 7/1989 | Tung | 346/154 |
| 4,967,203 | 10/1990 | Doan et al. | 346/1.1 |
| 4,975,785 | 12/1990 | Kantor | 353/447 |
| 5,001,767 | 3/1991 | Yoneda et al. | 358/462 |
| 5,005,139 | 4/1991 | Tung | 382/54 |
| 5,016,118 | 5/1991 | Nannichi | 358/462 |
| 5,025,325 | 6/1991 | Hudson | 358/447 |
| 5,029,108 | 7/1991 | Lung | 364/519 |
| 5,062,724 | 11/1991 | Iizuka | 400/121 |
| 5,117,294 | 5/1992 | Yano | 358/447 |
| 5,149,212 | 9/1992 | Murakami | 400/121 |
| 5,205,660 | 4/1993 | Momose | 400/304 |
| 5,207,517 | 5/1993 | Ito | 400/121 |
| 5,237,624 | 8/1993 | Okamoto et al. | 382/22 |
| 5,258,854 | 11/1993 | Eschbach | 358/445 |
| 5,267,332 | 11/1993 | Walch et al. | 382/55 |
| 5,270,728 | 12/1993 | Lund et al. | 346/1.1 |
| 5,293,579 | 3/1994 | Stockholm | 382/22 |
| 5,329,380 | 7/1994 | Ishida | 358/455 |
| 5,337,159 | 8/1994 | Iida et al. | 358/447 |
| 5,404,233 | 4/1995 | Nagata | 358/447 |
| 5,408,336 | 4/1995 | Ishida | 358/447 |
| 5,483,351 | 1/1996 | Mailloux et al. | 358/298 |
| 5,502,574 | 3/1996 | Nakajima | 358/400 |
| 5,515,179 | 5/1996 | Yamakawa et al. | 358/447 |
| 5,611,023 | 3/1997 | Hanyu | 395/109 |
| 5,649,028 | 7/1997 | Hollinger | 382/199 |

FOREIGN PATENT DOCUMENTS

| | | |
|---|---|---|
| 0356224A3 | 2/1990 | European Pat. Off. |
| 0506379A2 | 9/1992 | European Pat. Off. |

OTHER PUBLICATIONS

IBM Technical Disclosure Bulletin, vol. 25, No. 10, Mar. 1983.

*Primary Examiner*—Edward L. Coles, Sr.
*Assistant Examiner*—Madeleine Av Nguyen

[57] ABSTRACT

An improved method for providing a more faithful and pleasing rendition of a pixel pattern is described herein. This method first places the original pixel pattern in a bit mapped memory. A small portion of this bit mapped pattern, called an input tile, acts as an address for a look-up table containing a corrected pixel pattern portion (an output tile) corresponding to the target pixels to be corrected in the input tile. To derive the output tiles stored in the look-up table, a high resolution bit map is created from an input tile by scaling the input tile. A triangular portion of each convex corner in the high resolution bit map is chopped off, and a triangular portion of each concave corner in the high resolution bit map is filled in. The resulting pattern is then smoothed using a low pass filter. The size of these triangular portions and the extent of low pass filtering are determined using a function based on the vulnerability of a pixel to being eliminated during the above smoothing process. This regulation of smoothing helps preserve desired detail in the image. The middle portion of the high resolution bit map corresponding to the two original target pixels intended to be corrected is then divided up into a number of pixel areas, where each area represents a pixel to be printed. A threshold number is then compared to the pixels in each area, and a corresponding output pixel is then stored, printed, or otherwise displayed.

9 Claims, 5 Drawing Sheets

PIXEL CORRECTION AND SMOOTHING METHOD

This is a continuation of copending application Ser. No. 08/417,324 filed on Apr. 5, 1995, which is a continuation of Ser. No. 08/212,445, filed on Mar. 11, 1994 now U.S. Pat. No. 5,446,407.

FIELD OF THE INVENTION

This invention relates to the printing of pixels on a recording medium and, in particular, to a method for improving the quality of a displayed (e.g., printed) pattern formed of pixels.

BACKGROUND OF THE INVENTION

Text and pictures are sometimes printed using closely spaced dots, called pixels. The individual pixels are not easily perceived by the human eye but rather appear to merge into adjacent pixels to form a continuous, solid symbol or image. Such pixels are printed by facsimile machines, dot matrix printers, and other printing or displaying devices.

The generation of pixels, being digital rather than analog, inherently results in some quantization error, since a pixel is usually either black or white. Pixels of complementary colors or gray shades can also be printed, and the resulting printed patterns suffer (to varying degrees) from the same quantization effects as patterns printed using only black and white pixels. Thus, a diagonal line printed with pixels will usually appear as small steps rather than a smooth diagonal line due to this quantization error. This problem also appears in attempting to print any symbol or line which is not comprised of solely horizontal or vertical lines. As the printed dots per inch (dpi) is increased, this quantization error becomes less noticeable.

The dpi printing in facsimile machines is intentionally set to be relatively low to enable faster transmission of the pixel data to the receiving facsimile machine. Thus, because of the relatively large pixels printed by a facsimile machine due to the low dpi printing, diagonal and rounded figures appear jagged to the naked eye.

One known amelioration technique is to detect a certain pixel pattern in a block of pixels and insert an interpolated row of pixels to provide smoothing of this pixel pattern. Such smoothing may be performed by providing a look-up table which is addressed by the incoming pixel pattern and whose output contains one or more interpolated rows of pixels to augment the original pattern. The patterns stored in the look-up table can themselves be flawed and are difficult to generate.

Other methods of smoothing pixel patterns include row averaging, where an average of two original rows of pixels is inserted between the two original rows. This technique has certain disadvantages, such as causing dark and light areas of pictures to be unevenly affected, distorting them excessively. Further, any one-bit ticks or notches in a line of pixels are scaled into blobs, making them more conspicuous. Still further, horizontal scaling is not possible, limiting the amount of smoothing which can be done and resulting in visible jagged edges.

Another method for smoothing a pixel pattern is to perform low pass filtering on the pixel pattern. This technique removes stray dots and ticks as well as smooths the steps in diagonal or curved lines; however, such low pass filtering may also eliminate details from the original image, such as narrow white or black lines. Thus, such image processing causes dark and light areas of pictures to be unevenly affected, resulting in distortion.

The above techniques are usually used in combination with pixel scaling, where the dpi of the printer is set to be greater than the dpi of the original pixel pattern to increase the resolution of the printed pattern. Thus, for example, a block of four pixels may be printed for every one original pixel. Each printed pixel would then be approximately one-quarter the size of the original pixel to effectively increase the resolution of the printed pattern by four. Such scaling only has advantages when some correction of the original pixel pattern has been performed.

What is needed is an improved method for correcting quantization errors in a transmitted pattern formed of pixels.

SUMMARY

An improved method for providing a more faithful and pleasing rendition of a pixel pattern is described herein. This method first places the original pixel pattern in a bit mapped memory. A small block of this bit mapped pattern, called an input tile, acts as an address for a look-up table containing a corrected pixel pattern portion (an output tile) corresponding to the target pixels to be corrected in the input tile. In one embodiment, the input tile consists of two adjacent target pixels and their immediate neighboring pixels to form an input tile of twelve pixels. The corresponding output tile is then printed at a higher dots-per-inch (dpi) than the original pixel pattern to provide a corrected and higher resolution pattern. This process may also be performed using an algorithm which performs a correction on the target pixels in the input tile instead of addressing a corresponding output tile in a look-up table. The above process is repeated until all of the original pixels have had output tiles generated for them.

A novel method is described for deriving the output tiles. In this novel method, a high resolution bit map is created from an input tile by scaling the input tile by, for example, sixteen times in the x and y directions. A triangular portion of each convex corner in the high resolution bit map is chopped off, and a triangular portion of each concave corner in the high resolution bit map is filled in. The size of these triangular portions is determined using a function based on the exposed faces per minority pixel in the input tile. An exposed face of a pixel is a white-black (or black/white) transition on one of the pixel's sides. A minority pixel is whichever pixel type (e.g., black pixel or white pixel) is fewest in number in the input tile. The quotient of exposed faces divided by the number of minority pixels in the input tile is a measure of the average vulnerability of pixels in the input tile to being eliminated by the fills and chops in the above-mentioned step. The higher the quotient, the less smoothing should be done in this fills and chops step. This regulation of smoothing helps preserve desired detail in the image. Other suitable quotients representative of the vulnerability of pixels to being eliminated in a subsequent smoothing process may also be used to regulate smoothing.

Low pass filtering is then performed on the resulting high resolution bit map. The quotient previously calculated also regulates the amount of low pass filtering performed. This low pass filtering is much less than that needed by the prior art low pass filtering methods, since the high resolution bit map has already been partially smoothed in the previous step.

The middle portion of the high resolution bit map corresponding to the two original target pixels intended to be corrected is then divided up into a number of pixel areas, where each area represents a pixel to be printed. In one embodiment, the middle portion of the bit map is divided into six pixel areas. Due to the initial scaling by sixteen, a large number of pixels resides in each pixel area.

A threshold number is set which determines whether a pixel area should be printed as a black dot or a white dot. This threshold may be adjusted based upon the amount of ink-bleed, or other marking agent bleed, experienced when the image is printed on a recording medium.

The preferred method also detects input tile exceptions which are not subject to the normal corrections. Such an exception may be the detection of a stray dot or a notch or tick in a line of pixels. These exceptions are then corrected accordingly.

A method for detecting whether a pixel pattern is text or an image (e.g., a picture) is also described.

DETAILED DESCRIPTION OF THE PREFERRED EMBODIMENTS

Figure 1:
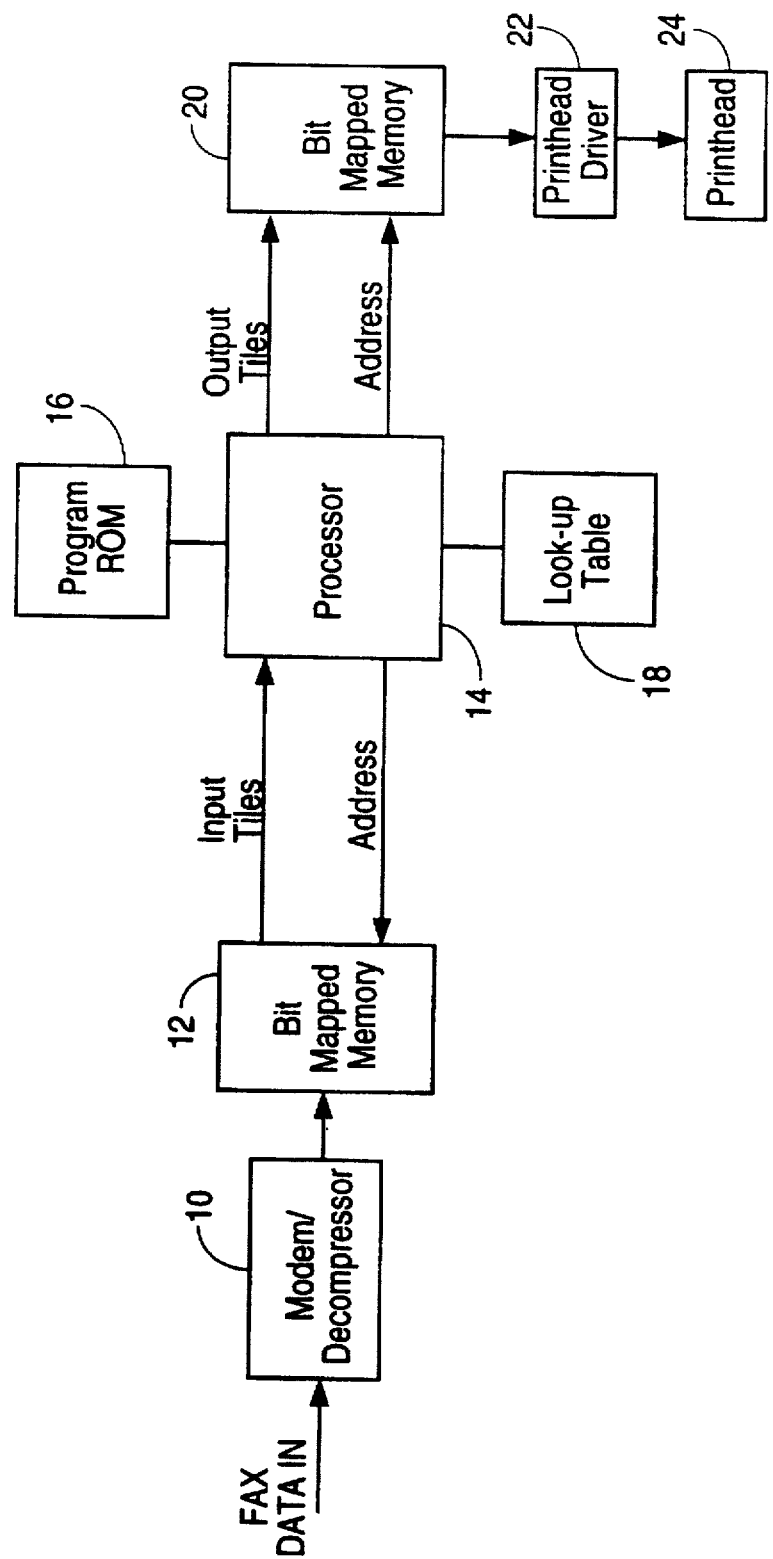
FIG. 1 is a block diagram of a circuit which may be used to perform the inventive method.

FIG. 1 is a block diagram illustrating one embodiment of the invention. The operation of the inventive structure will be described in the context of processing pixel data received at a facsimile machine containing the circuitry of FIG. 1. This invention, however, may also be applied to any type of display device using pixel type displaying where the original pixel pattern is desired to be enhanced and outputted at a higher resolution than the original pixel pattern.

In FIG. 1, the raw facsimile data is received at an input port of a conventional modem and suitably decompressed to convert the transmitted digital codes into pixels for printing by the receiving facsimile machine. This conventional circuitry is shown as modem/decompressor 10. This processed pixel data is then temporarily stored in a first bit mapped memory 12. In prior art facsimile machines, the pixels in bit mapped memory 12 would be printed by the facsimile machine. This pixel image contains perceptible quantization errors and other undesirable qualities. To remove these undesirable qualities and to enhance the pixel data stored in bit mapped memory 12, the following circuitry is provided.

A processor 14 is used to modify the pixel data contained in memory 12 in accordance with a set of rules. The processor 14 operates by receiving an input tile from bit mapped memory 12 and outputting a corresponding output tile to bit mapped memory 20. In one embodiment, processor 14 performs an algorithm on an input tile of the pixel data, in accordance with a set of instructions contained in a program ROM 16, to convert target pixels in the input tile to an output tile containing enhanced pixel data. In another embodiment, processor 14 may be an ASIC which is hard-wired to replace target pixels in the input tile with an output tile previously stored in a look-up table 18. A microprocessor may also be used to index output tiles in look-up table 18. The use of an algorithm and the look-up table 18 are described in detail below.

The operation of the circuit of FIG. 1 when an algorithm is used by processor 14 to modify the pixel data is described with respect to FIG. 2 and FIGS. 3A–3D. (This algorithm may also be used to initially create the output tiles stored in look-up table 18 if processor 14 is used to index the output tiles in look-up table 18.)

In step 1 (FIG. 2), the processor 14 addresses a small block (an input tile) of pixel data in memory 12. In a preferred embodiment, one input tile consists of two adjacent pixels in a row in memory 12 and their nearest neighbors. One such input tile 28 is shown in FIG. 3A as comprising twelve pixels or bits, where the central two pixels 29, 30 are the target pixels which are to be enhanced by the processor 14. The pixel data stored in memory 12 has an original resolution of N dots per inch (dpi) in the horizontal direction and M dpi in the vertical direction.

Figure 5:
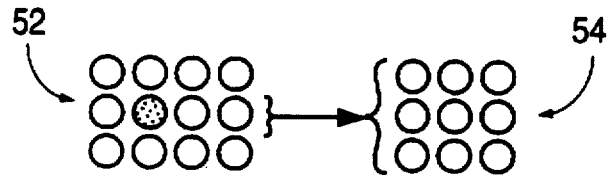
FIG. 5 illustrates a correction made to a stray dot in an input tile by eliminating the stray dot.

In step 2 processor 14 determines whether this input tile 28 is an exception. An exception occurs when the input tile matches one of a number of specific patterns which require special processing other than that described in the remainder of the flowchart of FIG. 2. One such exception is the appearance of a single isolated bit in the input tile, as illustrated in FIG. 5. This bit is assumed to be a stray bit appearing as a result of noise or a "dirty" original document. This bit is not enhanced but is simply deleted in a corresponding output tile (step 2'). Examples of other exceptions and the method used to handle these exceptions will be described later.

Figure 3A:
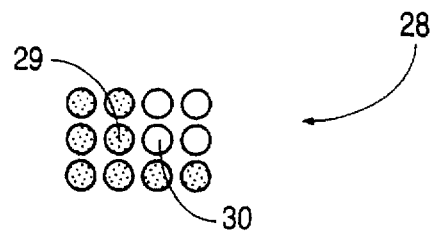
FIGS. 3A, 3B, 3C, and 3D, illustrate the processing of an input tile to generate an output tile having a corrected pixel pattern.
Figure 3B:
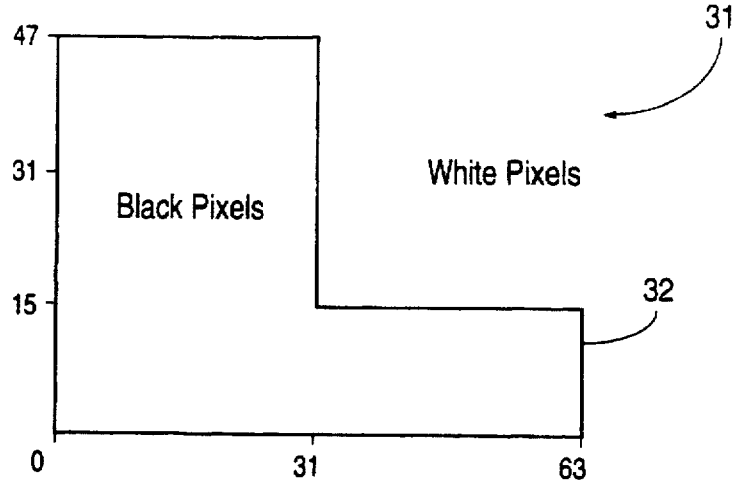

In step 3, a high resolution bit map 31 (FIG. 3B) is created from the input tile 28. In one embodiment, this high resolution bit map 31 is formed by expanding the input tile 28 by a factor of sixteen in both the x and y directions, as shown in FIG. 3B. In FIG. 3B, the array of black pixels created by expanding input tile 28 is enclosed within the solid outline 32. In an alternative embodiment, a factor used to expand the input tile 28 in the x direction is different than a factor used to expand the tile 28 in the y direction.

In step 4, the processor 14 determines whether the high resolution bit map 31 is part of an image (e.g., a picture) or text. If it is determined that the bit map 31 is part of an image, the smoothing steps 5–7 are bypassed and step 8 is then performed on the bit map 31. The method for determining whether the bit map 31 is part of an image or text will be described later. If it is determined that the bit map 31 is part of text, the following operations are performed to improve the quality of the printed text.

In step 5, the following calculation is performed to determine the extent of initial smoothing to be conducted in step 6:

$$Q = \frac{\text{exposed minority pixel faces in input tile}}{\text{number of minority pixels in input tile}} \quad \text{Eq. 1}$$

where a higher Q value results in less smoothing being performed in steps 6 and 7. The exposed pixel faces referred to in Equation 1 is the number of faces (maximum of four per pixel) of a minority pixel facing a white-black or black-white transition; the borders of the input tile are not counted as a transition. A minority pixel is the pixel type (black or white) which is fewest in number in the input tile. The Q value is thus the average number of exposed faces per minority pixel in the input tile.

This Q value is a measure of the average vulnerability of pixels to being eliminated by the initial smoothing in step 6. Thus, when the minority pixels are few and these minority pixels have a high number of exposed sides, they are susceptible to being eliminated by the initial smoothing in step 6 unless a correction factor (i.e., the Q value) is applied to the initial smoothing.

Regulating the amount of smoothing not only helps preserve detail, but also lessens the damage done if the text/image separation step 4, mentioned above, fails. If an input tile is erroneously considered text (but is actually part of an image), the pixels in it are likely to be somewhat scattered, resulting in a high Q value and causing less smoothing to occur. The picture is then not significantly altered.

This Q value is also used in determining the size of the template used in performing low pass digital filtering (step 7) on the high resolution bit map after step 6 has been concluded.

Other suitable Q values may be calculated by using equations other than Equation 1. For example, another suitable Q value may be calculated as follows: compute the number of exposed corners on the most exposed middle pixel, corresponding to target pixel 29 or 30 (FIG. 3A), in an input tile. The "exposure" of a pixel is the number of exposed corners it has. A pixel's corner is "exposed" if its three neighbors are all the opposite color or type. For example, assume in the arrangement of pixels below that the B pixels are black and the W pixels are white.

$$
\begin{array}{cccc}
W & W & W & W \\
W & B_1 & B_0 & W \\
W & W & B_2 & W \\
\end{array}
$$

The $B_0$ pixel above has one exposed corner (i.e., its upper right corner. The $B_1$ pixel has two exposed corners. The exposed corners of the most exposed pixel is then stored as the Q value. This "exposure" is a number from zero to four. The higher this number, the more vulnerable the pixel is to being eliminated during the subsequent smoothing steps. This exposure number can be used instead of the Q value specifically identified in Equation 1. In a special case, if the exposure of the most exposed pixel as computed above is one, and if either both the top and bottom sides of the pixel are exposed or both the left and right sides are exposed, then the exposure is increased to two. For example, in the pixel arrangement of:

$$
\begin{array}{cccc}
B_1 & W & W & W \\
B_1 & B_0 & W & W \\
W & W & B_1 & B_1 \\
\end{array}
$$

the actual exposure of pixel $B_0$ above is one, but because both the top and bottom of $B_0$ are exposed, the exposure is increased to two, reflecting the fact that this pixel $B_0$ is more vulnerable to being eliminated than its one exposed corner would suggest. This technique is heavily weighted toward the middle two pixels, whereas the Q value calculated by Equation 1 is an average vulnerability over the entire input tile. This technique is therefore more conservative than the Q value technique of Equation 1 in that a target pixel 29, 30 is less likely to be smoothed excessively.

Other suitable equations for a Q value may be used instead, where the Q value reflects the vulnerability of a pixel to being undesirably eliminated in the subsequent smoothing steps 6 and 7.

Figure 3C:
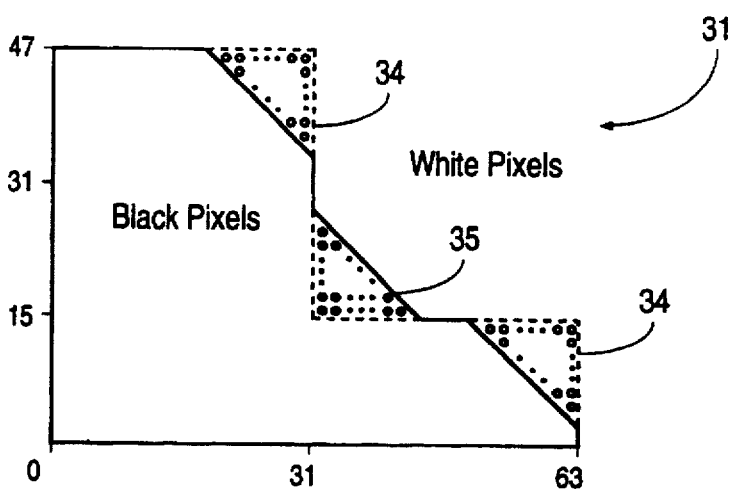

In step 6, an initial smoothing of the 90° corners of white/black or black/white pixel transitions in the high resolution bit map 31 is performed by either chopping off a certain size triangular corner 34 (FIG. 3C) of the 90° convex angles or filling in the 90° concave angles with a certain size triangle 35. The size of these triangles corresponds to the previously determined Q value, where a higher value of Q corresponds to smaller triangles (i.e., less smoothing) being used in the chopping and filling step above. Such a chopping and filling step is illustrated in FIG. 3C. In FIG. 3C, the pixels deleted or added in step 6 are shown within dashed lines.

The below Table I illustrates one example of a correlation between a calculated Q value and the percentage of the maximum triangle size to be chopped off or filled during step 6.

TABLE I

| Q value | Chop/Fill % of Max |
|---------|-------------------|
| 0–.99   | 100 |
| 1–1.99  | 100 |
| 2–2.99  | 75  |
| 3–4     | 35  |

In the example of FIGS. 3A–3C, there are four minority pixels in input tile 28 having a total of four exposed faces, resulting in a Q value of one, assuming Equation 1 is used. Given this fairly low value of Q, a large initial pre-smoothing using the triangular chops and fills is performed by, for example, chopping off a right triangle portion having twelve pixels on two of its equal sides from the convex corners and filling in the concave corner with a right triangle having twelve pixels on two of its equal sides. The maximum triangle size to be used in step 6 can be determined empirically and depends upon the original dpi of the pixel pattern and the degree of initial smoothing desired.

In step 7, the resulting pre-smoothed high resolution bit map 31 is subjected to a conventional digital convolution using a relatively small convolution template which acts as a low-pass filter. This filter is designed to smooth small rough edges but still leave the larger features mostly unchanged. By performing the pre-smoothing in step 6 of the large 90° angles, the digital filter in step 7 can use a higher-pass convolution than the prior art filters so as to preserve any thin black lines and thin white gaps. Thus, in steps 6 and 7, smoothing is performed, yet details are not obliterated. The larger the Q value, the smaller the template used for digital filtering. Optimal template sizes may be determined empirically. Such templates may be circular if the facsimile machine is operating in the fine mode or oval (height =2×width) for the standard mode.

Figure 3D:
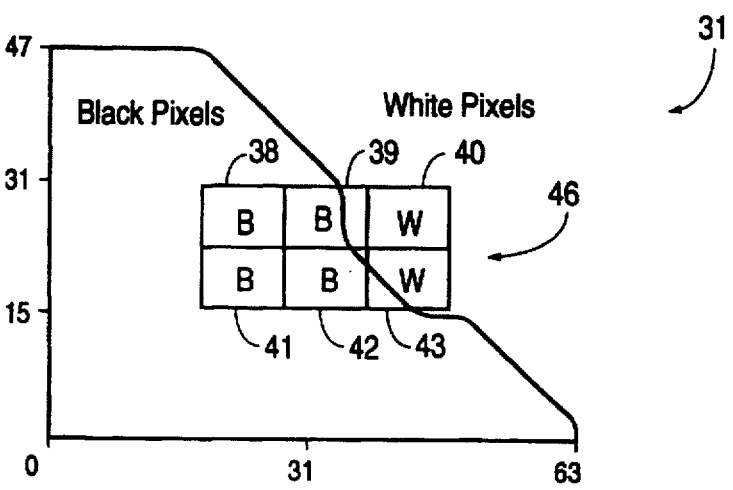

The resulting high resolution bit map 31 after smoothing by the conventional digital filter is illustrated by the outline of the black pixels in FIG. 3D.

In step 8, the middle portion of the high resolution bit map 31 corresponding to the two target pixels 29, 30 in the input tile 28 (FIG. 3A) is segmented into as many pixel areas 38–43 (FIG. 3D) as are desired to replace the two original target pixels 29, 30. For example, if it were desired to print a higher resolution image by converting the two original target pixels 29, 30 into six printed pixels, the area of the high resolution bit map 31 corresponding to the two target pixels 29, 30 would be divided up into six equal size pixel areas 38-43. Pixel areas 38-43 may overlap to some degree if desired. In one embodiment, the horizontal scaling for printing is 1.5 (corresponding to three output pixels in a row) and the vertical scaling is two (corresponding to two rows of output pixels). Such segmenting is shown in FIG. 3D. In another embodiment, the vertical scaling is three so that the dpi in both the horizontal and vertical directions are the same (e.g., 300 dpi).

In step 9, the number of black pixels within a single pixel area 38-43 is determined and, if this number is greater than a threshold number, the pixel to be printed corresponding to that area 38-43 will be a black pixel. If the number of black pixels is below the threshold, a white pixel will be printed for that pixel area. (This threshold number can also be set based on the number of white pixels in a pixel area.) The threshold number may be adjusted to take into account any ink bleed, or other marking agent bleed, when printing or otherwise displaying a pixel on a medium. By properly setting the threshold number, a faithful reproduction of the overall image brightness or darkness can be had. The threshold number may be set based upon empirical methods in view of the type of marking agent used, the recording medium used, and the printing method used. In the example of FIG. 3D, the threshold number is set to one half the total number of pixels in a pixel area 38-43, and the resulting determination of a black or white pixel to be printed for each pixel area 38-43 is shown by a B or W.

In steps 10 and 11, the output tile 46 (FIG. 3D) consisting of one pixel per pixel area 38-43 is outputted from the processor 14 and stored in a second bit mapped memory 20 (FIG. 1) for subsequent display (e.g., printing) on a medium. (The generated output tiles may instead be stored in look-up table 18 for later indexing by a corresponding input tile.) Since the output tile contains six pixels for every two target pixels 29, 30, the bit mapped memory 20 is three times as large as the bit mapped memory 12.

The above process is performed on all or a number of input tiles in the bit mapped memory 12 to generate a number of output tiles 46 stored in bit mapped memory 20. The pixels in the output tiles 46 stored in bit mapped memory 20 are now sequentially addressed and printed (or otherwise displayed) in step 11 at a horizontal dpi of U and a vertical dpi of V, which are higher than the original horizontal dpi and vertical dpi of N and M, respectively. In the illustrative embodiment of FIGS. 3A-3D, six pixels will be printed in the space of two pixels from the original pixel pattern stored in memory 12, although any other size output tile (e.g., a 3×3 array) may be generated, stored, and displayed. Conventional addressing and printhead driver circuitry 22 (FIG. 1) is used to output the pixels from memory 20. Printhead driver 22 controls a conventional printhead 24 to print or otherwise display the corresponding pixels on a recording or display medium.

It will be understood that any number of pixels may be contained in an output tile, depending upon the desired resolution of the final printed pixel pattern. Further, any level of smoothing may be performed in steps 6 and 7, and this optimum smoothing may be determined empirically, depending upon what is believed by the user to be the most pleasing effect.

Figure 2:
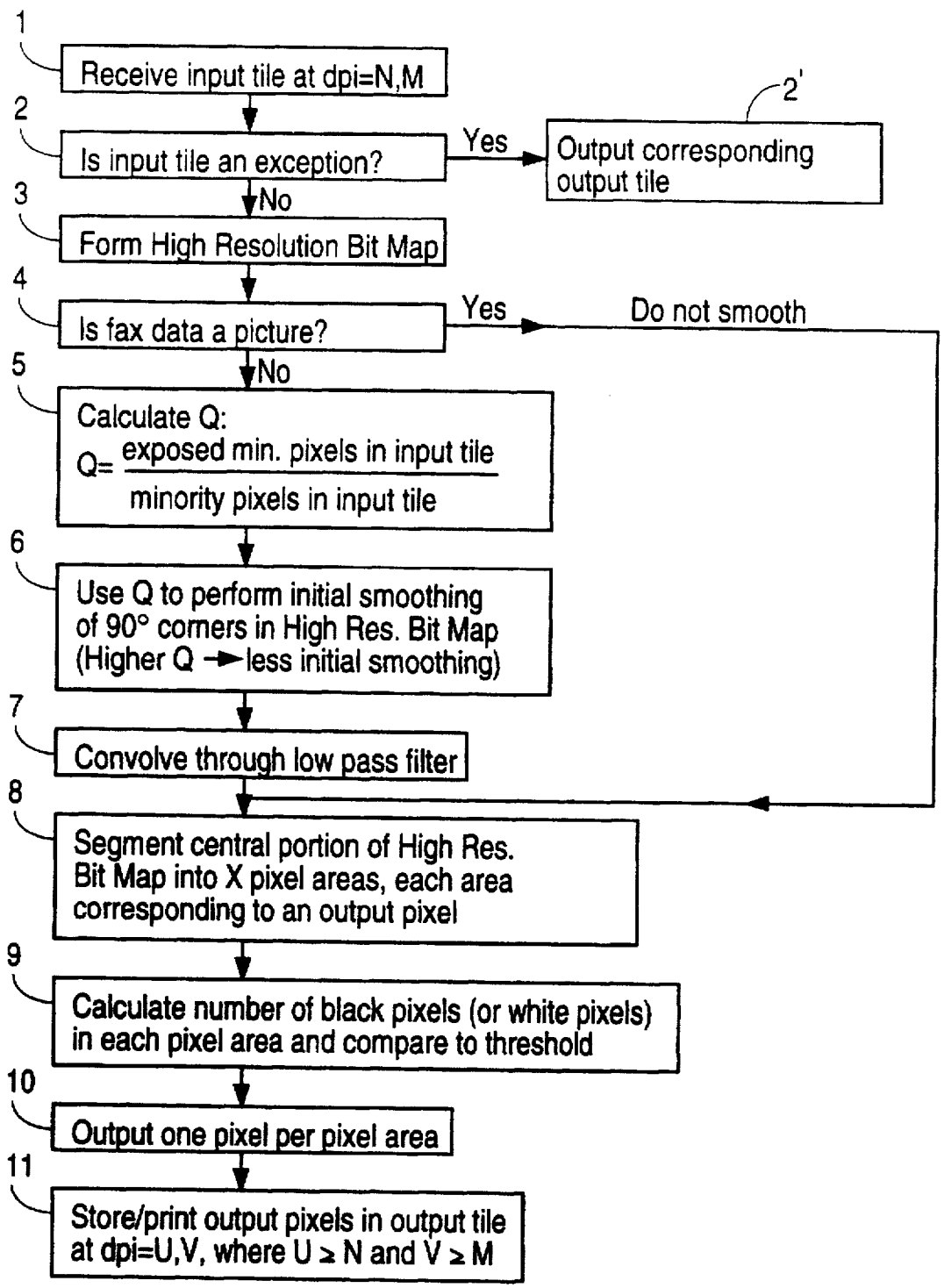
FIG. 2 is a flow chart illustrating the preferred steps in a method for creating output tiles.

In the above method shown in FIG. 2, an algorithm was performed on each input tile 28 to convert each input tile 28 into an output tile 46 using the algorithm contained in the program ROM 16.

Figure 4:
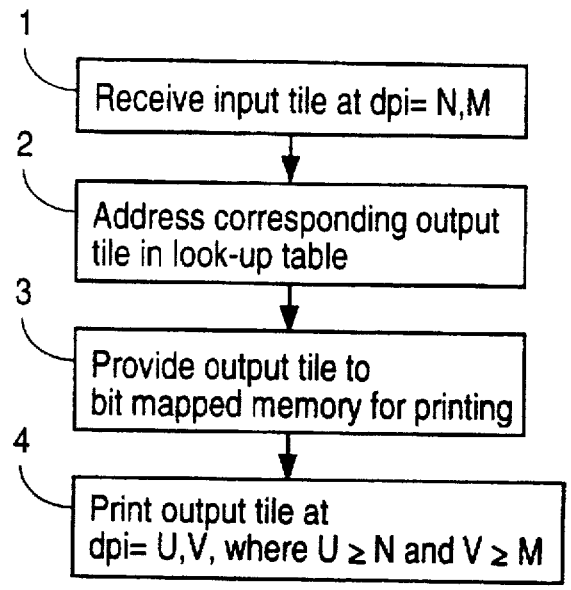
FIG. 4 is a flow chart illustrating the steps used to fetch an output tile from a look-up table.

A much less computationally intensive process is described with respect to FIG. 4 and utilizes a look-up table 18 (FIG. 1). In this embodiment, processor 14 consists of a hard-wired ASIC or a microprocessor. In this process, look-up table 18 contains the output tiles for every combination of twelve pixels in an input tile, for a total of 4096 output tiles. The output tiles are initially created for all possible input tiles using the procedure described above with respect to FIG. 2. The input tiles then act as an index to select a corresponding output tile from look-up table 18, and this indexed output tile is then outputted to bit mapped memory 20.

In the process shown in FIG. 4, step 1 corresponds to step 1 in FIG. 2. In step 2, an output tile in look-up table 18 is addressed or indexed using the input tile as the address. For example, the input tile 28 in FIG. 3A would address the stored output tile 46 in FIG. 3D. In step 3, this output tile is transferred to bit mapped memory 20. And, in step 4, the pixels in bit mapped memory 20 are printed out at a horizontal dpi of U and a vertical dpi of V, which are higher than the original horizontal and vertical dpi of N and M, respectively.

The output tiles stored in look-up table 18 are derived using the process illustrated in FIGS. 2 and 3A-3D for each input tile desired to be enhanced.

The input tile exceptions, previously mentioned, include a stray dot exception and a tick or notch exception. The stray dot exception is illustrated in FIG. 5, where the input tile 52 contains an isolated black or white pixel. Since there are no intentional characters being formed of a single pixel, it is presumed that this isolated pixel is a product of noise or a dirty original. Accordingly, once this type of input tile is detected, the isolated pixel is deleted, and a corrected output tile 54 is outputted by processor 14. The particular illustration of FIG. 5 shows the center two target pixels being converted into a 3×3 array of pixels, although other output tile array sizes can also be used. Such an output tile 54 may be stored in the look-up table 18 or, if the input tile 52 is processed using an algorithm as described in FIG. 2, the output tile 54 would be generated pursuant to a branch routine containing the exception algorithm.

Figure 6:
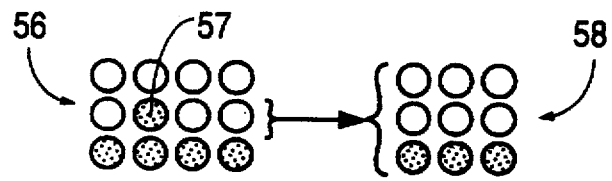
FIG. 6 illustrates an exception when a pixel pattern includes a tick, where the tick has been removed but is reflected in the outputted pixel pattern.

FIG. 6 illustrates another input tile 56 exception which is a tick (pixel 57) abutting a row of pixels. Such a tick is usually caused when the thickness of a line in an original document is very close to a threshold quantization level and only once in a while exceeds that threshold level. Thus, the tick is not a result of noise or a dirty original, but provides information as to the original image. In this exception, a tick is scaled in the corresponding output tile 58 to a thin horizontal line, equal to one-third the thickness of a full line. This assumes the output tile consists of 3×3 array of pixels. Thus, the thickness of the printed line containing the tick would increase slightly when the complete image has been printed.

Figure 7:
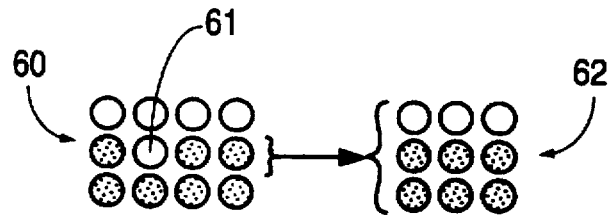
FIG. 7 illustrates an exception when a pixel pattern includes a notch, where the notch has been removed but is reflected in the outputted pixel pattern.

FIG. 7 illustrates an input tile 60 containing a notch (pixel 61) in a line of pixels. This exception presumes that the notched line is slightly thinner than a full line and thus scales the notched line in the output tile 62 to a line equal to two-thirds the thickness of a full line. This assumes the output tile consists of a 3×3 array of pixels. The corrections to ticks and notches may also apply to vertical lines as well.

In the illustration of FIGS. 5-7, the vertical scaling of the printed image is 3.0 and the horizontal scaling is 1.5, so that three rows and three columns of are outputted for every two horizontally adjacent original target pixels.

If an original facsimile image is determined to be a picture (or other non-text image) in step 2 of FIGS. 2 and 4, then it may not be desirable to correct this image since it is not known whether any features or angles are intentional or a result of quantization error. Thus, if it is determined that an input tile is a portion of an image, no correction should be performed, and the target pixels in the input tile should be scaled to provide an output tile at the increased horizontal and vertical dpi of U,V, as shown in FIG. 2.

Figure 8:
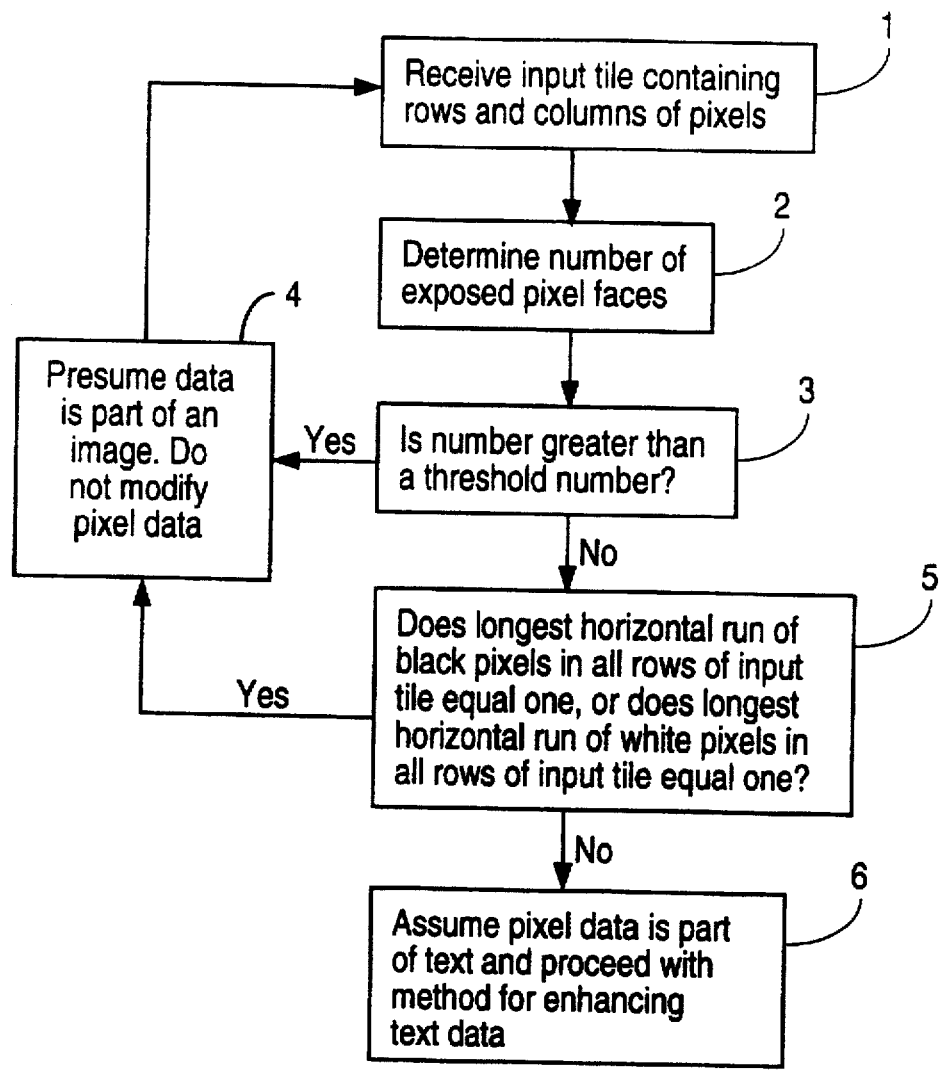
FIG. 8 is a flow chart illustrating the steps used to determine whether an input tile is a part of an image or text.

FIG. 8 is a flowchart of one method to determine whether the pixel data forms text or an image (e.g., a picture). In the preferred embodiment, the determination that a received input tile in step 1 is part of an image is made if one or both of the following two conditions are met. The first condition is if the number of exposed pixel faces (i.e., black-white transitions) within an input tile is greater than a certain threshold. If so, it is apparent that the minority pixels in the input tile are scattered and are part of an image (e.g., a halftone image). This is illustrated in steps 2, 3, and 4. The second condition is if the longest black horizontal run is one pixel in all of the rows of the input tile, or the longest white horizontal run of pixels is one pixel in all of those rows (step 5). This second condition is consistent with the formation of very narrow lines or gaps which are used in pictures but not used in text. If the above conditions are met, the smoothing steps 5–7 in FIG. 2 are skipped, and the image data is processed in accordance with the remainder of the steps shown in FIG. 2. If a look-up table 18 for outputting enhanced output files is used, the image data may bypass the look-up table 18 and be scaled accordingly to match the dpi of the printer.

If the above conditions are not met, then the process of FIGS. 2 or 4 for generating a modified output tile for that input tile would proceed (step 6 in FIG. 8). The processor 14 in FIG. 1 would contain the necessary circuitry to determine whether the input tile pattern meets one or both of the above conditions. One form of suitable circuitry may be a comparator circuit which compares the input tile pattern to a number of stored patterns which meet the above two conditions. One skilled in the art could easily fabricate such a circuit or develop an algorithm for making such a determination.

Typically, facsimile machines may be set to either a standard mode (98×203 dpi) or a fine mode (196×203 dpi). In the standard mode, if it were desired to print at 300 dpi in both the vertical and horizontal directions, vertical scaling must be 3.0 and horizontal scaling must be 1.5. The resulting three-row output tiles, containing nine pixels each, would require 8192 bytes in look-up table 18. For vertical scaling of 2.0, two-row output tiles containing six bits each would be used and require 4096 bytes in look-up table 18. In the fine mode at 300 dpi, vertical scaling is 1.5, so only one or two-row output tiles are required, using only 4096 bytes in the look-up table 18 for each set of output tiles. To achieve a vertical scaling of 1.5, odd numbered rows of pixels may be scaled vertically by 1.0, and even rows of pixels may be scaled vertically by 2.0. The four scaling tables mentioned above only consume 20 Kbytes to accommodate both the standard mode and fine mode in conventional facsimile machines.

The circuitry of FIG. 1 and the algorithms described with respect to FIGS. 2–4 may be implemented by one skilled in the art in view of this disclosure using only conventional circuitry and programming techniques.

The pixels generated using the above methods may be ultimately displayed on any medium, such as on paper or on a display screen.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method for generating a look-up table containing a plurality of enhanced output pixels patterns for improving the quality of an original pixel pattern, said method comprising the steps of:

receiving one block of a plurality of blocks of pixels, said plurality of blocks of pixels corresponding to a pattern to be displayed, each of said blocks of pixels comprising x rows and y columns of pixels, each of said blocks of pixels comprising one or more target pixels and their surrounding neighboring pixels;

replicating each of said pixels in said particular block of pixels to expand said particular block of pixels by a factor z in a vertical direction and to expand said block of pixels by a factor q in a horizontal direction to form a high resolution bit map;

smoothing said high resolution bit map;

segmenting a middle portion of said high resolution bit map into a plurality of pixel areas, each of said pixel areas corresponding to an output pixel;

calculating a number of pixels of a first type in each of said pixel areas;

comparing said number of pixels of said first type in each of said pixel areas to a threshold number;

outputting one pixel per pixel area, to form an enhanced output pixel pattern; and storing said enhanced output pixel pattern in said look-up table.

2. The method of claim 1 wherein said enhanced output pixel pattern contains more pixels than said one or more target pixels in said block of pixels.

3. The method of claim 1 wherein said one or more target pixels comprise two target pixels, and wherein said neighboring pixels comprise 10 pixels surrounding said target pixels.

4. The method of claim 1 wherein said step of smoothing comprises the steps of:

performing an initial smoothing of said high resolution bit map by eliminating 90° convex and concave corners in said high resolution bit map, said high resolution bit map being comprised of a combination of pixels of a first type and pixels of a second type, said concave corners and said convex corners being defined by said pattern transitioning from pixels of said first type to pixels of said second type, said convex and concave corners being eliminated by converting pixels of said first type to pixels of said second type and by converting pixels of said second type to pixels of said first type in said convex and concave corners; and performing a final smoothing of said high resolution bit map by filtering said high resolution bit map using a low-pass filter.

5. The method of claim 1 wherein:

said threshold number is based at least in part on an amount of expected marking agent bleed into a recording medium during a step of printing.

6. The method of claim 1 including the additional step of:

calculating a Q value representative of the vulnerability of said pixels to being eliminated, wherein said step of smoothing said high resolution bit map is performed in accordance with said Q value, where a higher Q value results in less smoothing being performed on said high resolution bit map.

7. The method of claim 6 wherein said step of calculating a Q value comprises the step of:

computing a number of exposed corners of a most exposed target pixel in said block of pixels, and performing a final smoothing of said high resolution bit map by filtering said bit map using a low pass filter.

8. The method of claim 7 further comprising the step of multiplying said Q value by approximately 2 if said number of exposed corners of said most exposed target pixel is 1, and either: 1) top and bottom sides of said target pixel are both exposed, or 2) left and right sides of said target pixel are both exposed.

9. The method of claim 6 wherein said step of calculating a Q value comprises the step of:

calculating a Q value as follows:

$$Q = \frac{\text{exposed minority pixel faces in said block of pixels}}{\text{minority pixels in said block of pixels}}$$

wherein said exposed minority pixel faces is a number of faces of a minority pixel in said block facing an adjacent pixel of a different type, and where a minority pixel is a pixel of a type which is fewest in number in said block, said Q value being a measure of the vulnerability of pixels in said block to being eliminated by subsequent smoothing of a pattern of said pixels in said block of pixels.

* * * * *